US006486463B1

(12) United States Patent
Bidiville et al.

(10) Patent No.: US 6,486,463 B1
(45) Date of Patent: Nov. 26, 2002

(54) COMPUTER INPUT DEVICE WITH ENCODERS HAVING FLEXIBLE SHAFTS AND CONICAL ROLLERS

(75) Inventors: Marc A. Bidiville, Pully (CH); Ying Chou Cheng, Hsin-Chu Hsien (TW)

(73) Assignee: Logitech Europe, S.A. (CH)

( * ) Notice: Subject to any disclaimer, the term of this patent is extended or adjusted under 35 U.S.C. 154(b) by 0 days.

(21) Appl. No.: 09/480,323

(22) Filed: Jan. 10, 2000

(51) Int. Cl.[7] .............................................. G06M 7/00
(52) U.S. Cl. ................... 250/221; 345/165; 250/231.13
(58) Field of Search ........................... 250/221, 231.13, 250/231.18; 345/154, 165, 166, 163

(56) References Cited

U.S. PATENT DOCUMENTS 5,559,534 A * 9/1996 Lin ............................. 345/165
6,300,620 B1 * 10/2001 Nicoud et al. ............... 250/221

* cited by examiner

*Primary Examiner*—Stephone Allen
*Assistant Examiner*—Bradford Hill
(74) *Attorney, Agent, or Firm*—Townsend & Townsend & Crew LLP

(57) ABSTRACT

A method and apparatus for replacing two separate photo detectors chips and two photo emitters by a single photo detector chip and a single photo emitter. This is achieved by using CombiDisks having a flexible shaft. The flexible section allows for the bending of the CombiDisks so that the encoder disks are next to each other and tangent to the same vertical plane. This allows for the placement of both the x and the y sensors in a single plane. This will in turn allow for the two photo detectors to be integrated in a single semiconductor chip, saving a separate photo detector chip, and its associated packaging. This additional savings is significant since the packaging itself contributes to approximately one half of the cost of such a detector.

14 Claims, 2 Drawing Sheets

COMPUTER INPUT DEVICE WITH ENCODERS HAVING FLEXIBLE SHAFTS AND CONICAL ROLLERS

BACKGROUND OF THE INVENTION

The present invention relates to computer input devices, such as mice and trackballs. In particular, it relates to the reduction of the number of components and improvements in tracking performance.

Typically, such input devices have a ball which is rolled when a user moves the mouse across the desktop, or is manipulated with the user's finger for a trackball. The ball is in frictional contact with various rollers. The ball's motion is detected by two rollers that are offset from each other at an angle of 90 degrees. These two rollers which rest against the ball detect the ball's motion in the x and y directions respectively. Each roller is typically connected to an encoder disk via a shaft, with the combination of the roller, shaft and encoder disk referred to as a "CombiDisk." Each encoder disk has radial slits, which when used in conjunction with a photo emitter and a photo detector allow for the determination of the amount of movement of the ball in the x or y directions. A pressure roller is provided, which is spring biased to provide a force to keep the ball engaged with the rollers of the CombiDisks. Typically designs use anywhere from one to three pressure rollers which are spring biased and provide improved shock loading. The ball rests against the pressure roller(s) and thus does not frictionally engage the cavity in the outer housing of the input device.

One of the challenges in the design of such input devices is the reduction of costs. In the extremely competitive input device market, savings of pennies are very significant. One method to reduce costs is to simplify the design and reduce the number of components required to the build the input device.

Another challenge in the design of such devices is tracking precision. Typical CombiDisks comprising cylindrical rollers, shafts, and encoder disks are held in place on axial supports, and are susceptible to axial play when the direction of movement changes. Axial play is the CombiDisk's axial translation with respect to its supports which is induced by the movement of the ball in a direction parallel to the axis of the CombiDisk. Typically, as the input device is moved, the ball gets rolled, and frictional forces drag the roller and hence the CombiDisk in the direction of the movement of the input device. Once the direction of the movement of the input device is changed, the CombiDisk "plays" in the changed direction. This axial play adversely impacts the tracking precision of such input devices. The shaft's longitudinal play also adds tolerances and requirements to the optical detection system to make the system insensitive to the variations of position of the disk relative to the photo emitters and detectors.

SUMMARY OF THE INVENTION

The present invention provides a method and apparatus for replacing two separate photo detector chips and two photo emitters by a single photo detector chip and a single photo emitter. This is achieved by using CombiDisks having a flexible shaft. The flexible section allows for the bending of the CombiDisks so that the encoder disks are next to each other and tangent to the same vertical plane. This allows for the placement of both the x and the y sensors in a single plane. This will in turn allow for the two photo detectors to be integrated in a single semiconductor chip, saving a separate photo detector chip, and its associated packaging. This additional savings is significant since the packaging itself contributes to approximately one half of the cost of such a detector.

The middle section of the CombiDisk is made of a highly flexible material such as spring steel, and is bent to create a spring force. This bending causes the CombiDisks to exert a spring force against the ball and hence eliminates the need to have a spring-biased pressure roller. The prior art spring-biased roller can now be replaced with a simple roller, eliminating a spring and the associated spring-bias linkage and assemblies, and hence provide for another cost savings.

The rollers on the CombiDisks in one embodiment of the present invention are conical. The conical rollers are tapered away from the encoder disks creating a ramp-like body causing the ball to want to move away from the encoder disks. Accordingly, the equal and opposite reactive force tends to move the conical roller towards the encoder disks. Since the rollers are rigidly attached to the encoder disks via a bent flexible shaft, the force created by the ball on the roller tends to push the encoder disk away from the ball. As such, the role of the conical rollers is to impart a compressive force along their axis of rotation. This force also ensures the encoder disk is always pressed against the axial stop, making the position of the disk more precise and not subject to axial play when the direction of the movement is changed.

In a preferred embodiment, CombiDisks contact the ball at 90 degrees. Each CombiDisk is comprised of a bent flexible steel shaft connecting a conical roller on one end to the encoder disk on the other. The two conical shaped rollers have a cone angle in the range of zero to 45 degrees, which is a function of the ball's size, and are biased against the ball, with the vertex of the cone opposite to the encoder disk. A third roller, in contact with the ball, is placed equidistant from the CombiDisk rollers and on the opposite side of the ball from the encoder disks. The semiconductor chip with the photo detectors is mounted vertically on one side, and the photo emitters are mounted vertically on the other side of the encoder disks.

DESCRIPTION OF THE SPECIFIC EMBODIMENTS

Figure 1:
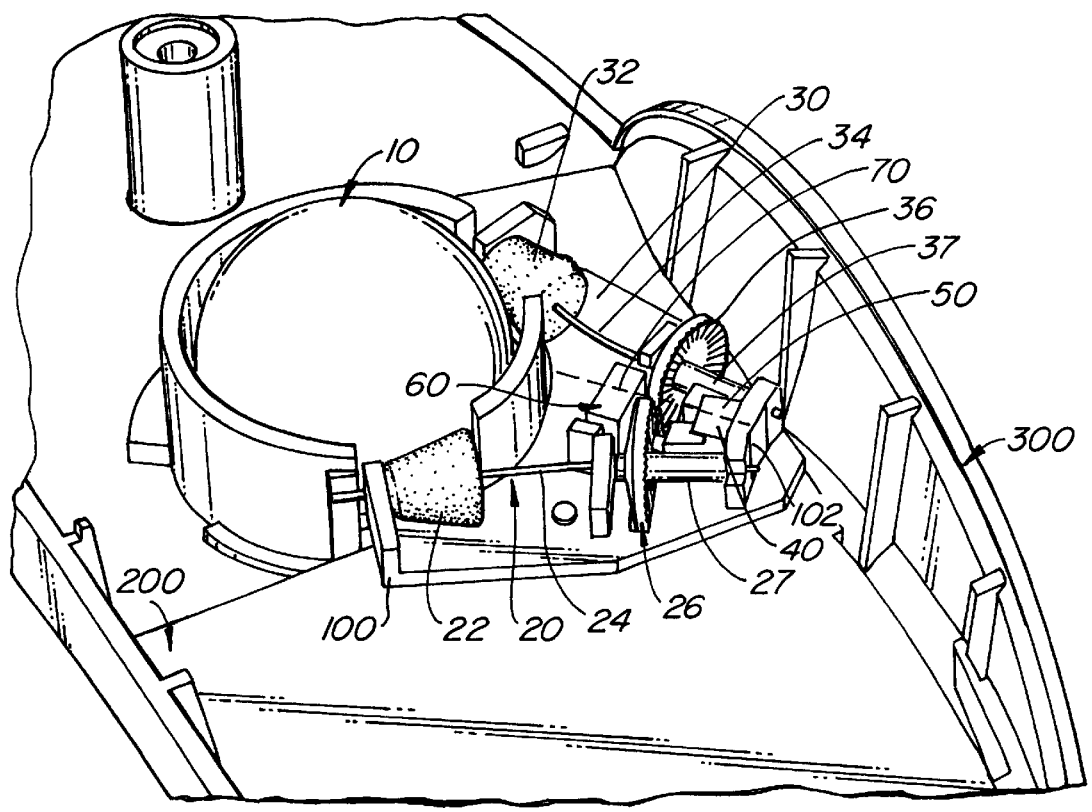
FIG. 1 is an assembly drawing of one embodiment of the present invention.

FIG. 1 is an assembly drawing of one embodiment of the present invention. FIG. 1 shows a movable ball 10, a first CombiDisk 20 and a second CombiDisk 30. FIG. 1 shows that the first CombiDisk 20 is comprised of a conical roller 22, a flexible steel shaft 24, and a conical encoder disk 26. FIG. 1 also shows that the second CombiDisk 30 is comprised of a conical roller 32, a flexible steel shaft 34 and a conical encoder disk 36. The conical rollers 22 and 32 are connected to the flexible steel shafts 24 and 34 respectively, which are in turn connected to the conical encoder disks 26 and 36 respectively.

The flexible steel shafts 24 and 34 are inserted into plastic conical rollers 22 and 32 on one side, and encoder disks 26 and 36, which are molded with plastic cylinders 27 and 37, on the other side. The conical rollers 22 and 32 are press fitted to the flexible shafts 24 and 34. Alternately, they may be glued or otherwise attached. Plastic cylinders 27 and 37 have holes that press fit with the steel shafts 24 and 34. The plastic cylinders allow for a better contact with the encoder shaft supports because the cylinders 27 and 37 can press up against the stop 102. The plastic cylinder 27 and the encoder disk 26 constitute one part. Likewise, the plastic cylinder 37 and the encoder disk 36 make another part. The plastic cylinders provide for an improved alignment of the encoder disks with the shafts. The plastic cylinders also provide for a wobble free rotation of the encoder disks due to their relatively long guiding lengths. The support structure 100 for the CombiDisks 20 and 30 is a separate part and is placed above the printed circuit board (PCB) 200, which is in turn placed above the bottom of the input device's housing 300. The relative positioning of the support structure 100, the PCB 200, and the housing 300 are maintained by proper alignment of pins on one body with apertures in the other. Alternately, the bottom housing of the input device could be formed to be used as the support structure 100 for the CombiDisks 20 and 30, with a PCB mounted between various supports and stops.

As shown in FIG. 1, the flexible steel shafts 24 and 34 bend through an angle of 15 degrees, allowing for the placement of the encoder disks 26 and 36 in one plane. Each of the encoder disks 26 and 36 may be cone-shaped. The cone-shaped encoder disks 26 and 36 in conjunction with the flexible shafts 24 and 34 allow for the adjacent placement of photo emitters 40 and 50 on the first side of the encoder disks 26 and 36, and the adjacent placement of the first and second photo detectors 60 and 70 on a single semiconductor chip on the second side of the encoder disks 26 and 36.

Figure 2:
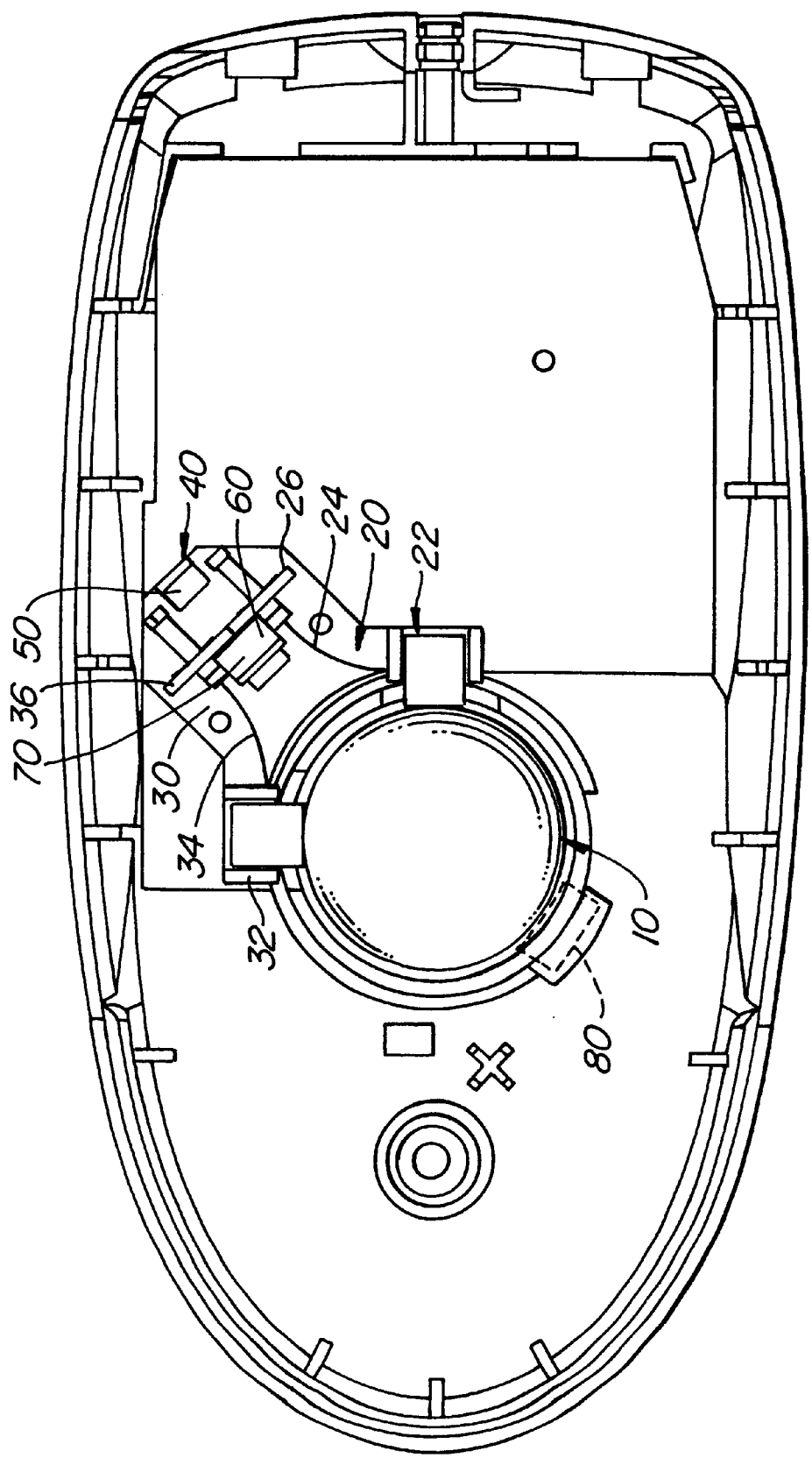
FIG. 2 is a top view of a variant embodiment of the present invention with cylindrical rollers.

The bent flexible shafts 24 and 34 provide the spring force necessary to push and hold the movable ball 10 against the third roller 80, which is visible in FIG. 2. The conical rollers 22 and 32, as depicted in FIG. 1, are tapered away from the encoder disks 26 and 36 creating a ramp-like body causing the ball 10 to have a tendency to want to move away from the encoder disks 26 and 36. Accordingly, the equal and opposite reactive force tends to move the conical roller 22 and 32 towards the encoder disks 26 and 36. Since the rollers 22 and 32 are rigidly attached to the encoder disks 26 and 36 via bent flexible shafts 24 and 34, the force created by the ball 10 on the rollers 22 and 32 tends to push the encoder disks 26 and 36 away from the ball 10. This force also ensures the encoder disks 26 and 36 are always pressed against the axial stop 102, making the position of the disk more precise and not subject to axial play when the direction of the movement is changed. Therefore in the manner described above, the taper angle of 15 degrees on the conical rollers 22 and 32 creates a force along the rollers' axis of rotation ensuring that conical disks 26 and 36 are resting against the stop 102, and thus eliminating the axial play of the encoder shafts 20 and 30 as the direction of the movable ball 10 is changed. As described above, the taper angle of the conical rollers is a way to control the axial force pressing the encoder disks against their stop; such that the larger the angle the higher the force. On one hand, this force should be kept as small as possible to reduce friction. And on the other hand, this force should be large enough to ensure that despite the movement of the ball, a minimal force remains to guarantee the plastic cylinders' contact with the stop.

As the ball 10 is moved, CombiDisks 20 and 30 rotate. Photo emitters 40 and 50 in conjunction with photo detectors 60 and 70 sense the rotation of the encoder disks 26 and 36 which have a light modulating surfaces. In this manner the CombiDisks 20 and 30 determine the amount of movement of the ball 10 in the x or y directions.

In one embodiment, photo detectors 60 and 70 are integrated in a single semiconductor chip in a single package, and in a like manner, the photo emitters 40 and 50 are also integrated on a single chip.

In another embodiment, the two photo emitters 40 and 50 can be placed on two semiconductor chips. In yet another embodiment, only one photo emitter may be used. The single photo emitter embodiment requires a photo emitter having a wide enough divergence to allow the light projecting from it to strike both encoder disks 26 and 36 and both photo detectors 60 and 70. Divergence can be achieved by placing the photo emitter farther from the encoder disks 26 and 36 rather than placing it adjacent to the encoder disks 26 and 36. As shown in FIG. 1, the photo emitters 40 and 50 are placed farther from the encoder disks 26 and 36 than the photo detectors 60 and 70.

Figure 1A:
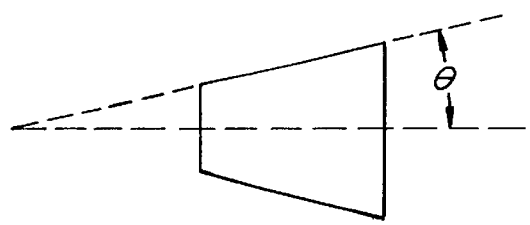
FIG. 1A shows the taper angle definition.

The encoder disks 26 and 36 are cone shaped and made of plastic material. As shown, the encoder disks 26 and 36 have an angle of 15 degrees. For the purposes of this application, the taper angle of a disk, a rollers, or a generic cone ($\theta$) is defined as the angle between the axis of rotation of the disk, roller or cone and the edge of the disk roller, or cone, as depicted in FIG. 1A. However this 15 degree angle is not absolutely necessary. In other embodiments, the taper angle of the encoder disks is increased as the angle through which the flexible shaft is bent is decreased. For example, the concept of using conical encoder disks has been disclosed in an earlier application, namely application Ser. No. 09/310,694. In that application, straight CombiDisks, offset from each other at an angle of 90°, using conical encoder disks having a cone angle of 45° were disclosed. That embodiment provided for one alternative for allowing a single photo detector chip. As can be inferred from these two embodiments, typical prior art CombiDisks and hence encoder disks are offset from each other by an angle of 90 degrees. Therefore, in order to place the encoder disks in the same plane, each CombiDisk and its associated encoder disk needs to be turned 45 degrees away from the other CombiDisk and its associated encoder disk. The preferred embodiment shown in FIG. 1 achieves this 45 degree turn by imposing a deviation of 15 degrees each on the roller, shaft, and encoder disk for a summed 45 degree turn. Other combination of angles may be used to arrive at this 45 degree bend.

In an alternate embodiment, flat cylindrical rollers, flexible shafts turned through an angle of 45 degrees and flat encoder disks would also allow for a single photo detector chip, as shown in FIG. 2.

In the preferred embodiment shown in FIG. 1, a combination of bent flexible shafts and conical encoder disks are employed. In this embodiment, the flexible shaft is not bent as much as the embodiment using the flat encoder disks, and the encoder disks' taper angle does not have to be as angled as in the prior application.

The light modulating surface of the conical encoder disks 26 and 36 implemented in conjunction with the photo emitters and the photo detectors are one alternative means of an encoding mechanism to determine the ball's movement in the x or y directions. The light modulating surface can be a slotted disk, like the prior art. An alternate embodiment of a light modulating surface could be a reflective surface comprised of alternate reflective and nonreflective portions, wherein the light would be directed at the encoder disk by the photo emitter and once reflected it would be received by the photo detector. Another embodiment of the light modulating surface could have an entirely reflective surface with portions having curvatures or notches to selectively concentrate the light in certain areas and not in other areas. Yet another embodiment of the light modulating surface could be a refractive surface, wherein light would be selectively focused by the surface before it is received by the photo detector. In the embodiments using the reflective light modulating surface, the photo emitter and the photo detector are placed on the same side of the encoder disks.

Yet another encoding mechanism could employ encoder disks having a magnetic surface used in conjunction with magnetic field detectors.

As will be understood by those skilled in the art, the present invention may be embodied in other specific forms without deviating from the essential characteristics thereof. For example, the steel shaft can be made of other materials such as plastic or composites; the combinations of the angles through which the flexible shaft is bent and the conical disks and rollers are tapered can also be numerous. Therefore, the forgoing disclosure is intended to be illustrative, but not limiting, of the scope of the invention which is set forth in the following claims.

What is claimed is:

1. A computer input device comprising:
    a housing;
    a movable ball placed in a cavity in said housing;
    a first rotating encoder assembly in contact with said ball, wherein said encoder assembly comprises a bent flexible shaft rigidly connecting a roller on said shaft's proximal end to an encoder disk on said shaft's distal end;
    a first photo emitter placed to direct light at said encoder disk; and
    a first photo detector placed to receive light from said encoder disk.

2. The input device of claim 1 further comprising:
    a second rotating encoder assembly in contact with said ball, wherein said second encoder assembly comprises a second bent flexible shaft rigidly connecting a second roller on said second shaft's proximal end to a second encoder disk on said second shaft's distal end;
    a second photo emitter placed to direct light at said second encoder disk; and
    a second photo detector placed to receive light from said second encoder disk, located on a single semiconductor chip with said first photo detector.

3. The input device of claim 2 wherein said two photo emitters are merged into one.

4. The input device of claim 2 wherein said two photo detectors are merged into one.

5. The input device of claim 1 wherein said bent flexible shaft is made of steel.

6. The input device of claim 1 further comprising:
    a cylindrical pressure roller, without a spring, biased against said ball, wherein a spring force on said ball is provided by said bent flexible shaft.

7. The input device of claim 1 wherein said bent flexible shaft bends through an angle having a range between zero and 45 degrees.

8. The input device of claim 1 wherein said encoder assembly comprises:
    a conical roller, rigidly attached to the proximal end of said bent flexible shaft, and biased against said ball;
    an encoder disk having a light modulating surface, rigidly attached to the distal end of said flexible steel shaft, and located adjacent to said first photo emitter and said first photo detector; such that light from said photo emitter is directed at said encoder disk and received by said first photo detector.

9. The input device of claim 8 wherein said encoder disk is conical, having a range of taper angles between zero and 45 degrees.

10. The input device of claim 8 wherein said conical roller is tapered having a range of taper angles between zero and 45 degrees.

11. The input device of claim 9 wherein the sum of (i) the taper angle of said conical roller, (ii) the bend angle of said flexible shaft and (iii) the taper angle of said encoder disk is 45 degrees.

12. A computer input device comprising:
    a housing;
    a movable ball placed in a cavity in said housing;
    first and second rotating encoder assemblies in contact with said ball, wherein each of said encoder assemblies comprises a bent flexible shaft rigidly connecting a roller on said shaft's proximal end to an encoder disk on said shaft's distal end;
    first and second photo emitters located to direct light at said first and second encoder disks;
    first and second photo detectors located to receive light from said first and second encoder disks; and
    a stop roller.

13. The input device of claim 12 wherein said encoder assemblies are each comprised of:
    a conical roller, rigidly attached to the proximal end of said bent flexible shaft, and biased against said ball; and
    an encoder disk having a light modulating surface, rigidly attached to the distal end of said bent flexible shaft, and located adjacent to one of said first and said second photo emitters and one of said first and second photo detectors; wherein said first photo emitter directs light at a first encoder disk and said second photo emitter directs light at a second encoder disk.

14. A computer input device comprising:
    a housing;
    a movable ball located within a cavity of said housing;
    first and second encoder assemblies, each of said encoder assemblies comprising, a shaft and a conical roller, wherein each of said encoder assemblies comprises a bent flexible shaft rigidly connected to an encoder disk;
    first and second photo emitters placed to direct light at said encoder disks
    first and second photo detectors placed to receive light from said encoder disks; and
    a stop roller.

* * * * *